Aug. 4, 1953

N. E. KLEIN ET AL 2,648,042

ORIENTATION SYSTEM

Filed July 6, 1944

Inventors
NORMAN E. KLEIN
JAY W. WRIGHT

By

Attorneys

Inventors
NORMAN E. KLEIN
JAY W. WRIGHT

Aug. 4, 1953   N. E. KLEIN ET AL   2,648,042
ORIENTATION SYSTEM
Filed July 6, 1944   5 Sheets-Sheet 4

Inventors
NORMAN E. KLEIN
JAY W. WRIGHT

Aug. 4, 1953 N. E. KLEIN ET AL 2,648,042
ORIENTATION SYSTEM
Filed July 6, 1944 5 Sheets-Sheet 5

Inventors
NORMAN E. KLEIN
JAY W. WRIGHT

By *G. A. Schmitt*
*Walter S. Paul*
Attorneys

Patented Aug. 4, 1953

2,648,042

UNITED STATES PATENT OFFICE 2,648,042

ORIENTATION SYSTEM

Norman E. Klein, Garden City, and Jay W. Wright, Manhasset, N. Y., assignors to the United States of America as represented by the Secretary of the Navy Application July 6, 1944, Serial No. 543,696

1 Claim. (Cl. 318—489)

This invention relates to orientation systems for maintaining a plane substantially normal to a relatively uniform magnetic field, and more particularly to orientation systems for use in conjunction with portable magnetometers.

In magnetometer systems the detector-magnetometer element is ordinarily so arranged that it may be maintained in substantial alignment with the direction of the uniform magnetic field to be investigated. In many such systems, the detector-magnetometer element is, for ease of construction, mounted substantially perpendicularly to a supporting plane. When systems of this type are arranged to be operated from a moving carrier and to measure variations in the earth's magnetic field, it is necessary to orient the supporting plane in space to maintain alignment of the detector-magnetometer element with the magnetic field irrespective of motion of the carrier. Thus, if an aircraft is used as the carrier, the orientation systems must provide means for stabilizing the detector-magnetometer element at all times for changes in the attitude of the carrier occurring during maneuvers such as climbs, dives, banks, and turns. Furthermore, if the field to be investigated is the earth's magnetic field, orientation adjustments must be made to compensate for changes in the magnetic dip which varies with the geographical location of the carrier.

Due to the fact that aircraft can cover great distances in relatively short periods of time, it is desirable that the orientation system be arranged for operation in any geographical area. To meet this requirement, the orientation system would have to be capable of maintaining alignment as the dip angle varied between $+90°$ and $-90°$ measured from the horizontal. However, since the polarity of the dip angle reverses at the magnetic equator (zero dip angle), the demands on the orientation system may be lessened considerably by providing means for turning over the detector-magnetometer element as the equator is passed. Conveniently, this may be done electrically by means of suitable reversing switches. For operation in areas near the magnetic equator, however, it is often inconvenient to perform the switching operation whenever the equator is crossed. It is desirable, therefore, to provide some overlap such that the orientation system as arranged for use in the northern hemisphere can be used without switching in the equatorial portions of the southern hemisphere, and vice versa.

In view of the above, minimum requirements upon the orientation system are that it maintain the magnetometer element in substantial alignment with the earth's magnetic field over dip angle ranges extending from $+90°$ to approximately $-15°$ and from $-90°$ to approximately $+15°$, the latter range being obtained by switching, and that such alignment be maintained irrespective of the normal changes in attitude of the carrier.

It will be understood, therefore, that in order to meet the requirements set forth above as the carrier makes a 360° turn, the orientation system must provide means for rotating the detector-magnetometer element through a complete revolution about a vertical axis extending through the center of the detector-magnetometer element, the longitudinal axis of this magnetometer element forming an angle of 90° minus the prevailing dip angle with the vertical axis. If, as suggested above, the detector-magnetometer element is supported by a mounting plane extending normal thereto at its midpoint, the orientation system must rotate the plane about a vertical axis extending through the junction of the magnetometer element and the plane, the plane forming an angle with this axis equal to the dip angle.

Heretofore, and as disclosed in copending applications Serial No. 529,003, filed March 31, 1944, Magnetic Stabilization System, Donald G. C. Hare, and Serial No. 532,144, filed April 21, 1944, Orientation System, Otto H. Schmitt, orientation systems have been provided in which adjustments of the orientation of a plane about two substantially mutually perpendicular axes, one of which is fixed in the carrier, were effected by means of a magnetic stabilization system. In each of the systems therein disclosed the fixed axis of rotation was horizontal, and definite mechanical limitations were imposed upon rotation about the two axes by the connecting wires associated with the magnetometers, these necessarily being of finite length. Orientation systems of this type can, through combinations of rotations about the two axes above mentioned, effect suitable rotations of the plane about the vertical axis defined above so long as the dip angle is between $+90°$ and approximately $+30°$ or between $-30°$ and $-90°$. As the dip angle reaches zero, the rotation about the non-fixed rotational axis must be continuous.

If the fixed axis of the system mentioned above is supported vertically, the operating limits of the orientation system are changed, and the unit is then suitable for use in equatorial regions but not in polar regions where rotation of the non-fixed axis must again be continuous. While such continuous rotation may be achieved through the use of slip rings in the electrical circuits, this construction is disadvantageous due to the mechanical friction and increased susceptibility to electrical "noise" introduced thereby.

In view of the above, it is an object of the invention to provide an orientation system capable of producing a complete and continuous rotation of a plane in space, irrespective of the prevailing magnetic dip angle and irrespective of ordinary maneuvers of the carrier upon which it is mounted, without requiring the use of slip rings or similar devices.

It is a further object of the invention to provide an orientation system in which the necessary orienting movements are effected automatically and without necessitating mechanical adjustments of the system.

Accordingly, the invention provides in one aspect, in an orientation system for maintaining a plane substantially normal to a relatively uniform magnetic field, a gimbal suspension supporting the plane for rotation about inner and outer gimbal axes, means supporting the gimbal suspension for rotation about a third axis substantially perpendicular to the outer gimbal axis, means sensitive to changes in the direction of the magnetic field in respect to the plane for controlling orienting rotations of the plane about the gimbal axis, and means sensitive to rotation of the plane about the inner gimbal axis for controlling rotations of the gimbal suspension about the third axis.

Figure 1:
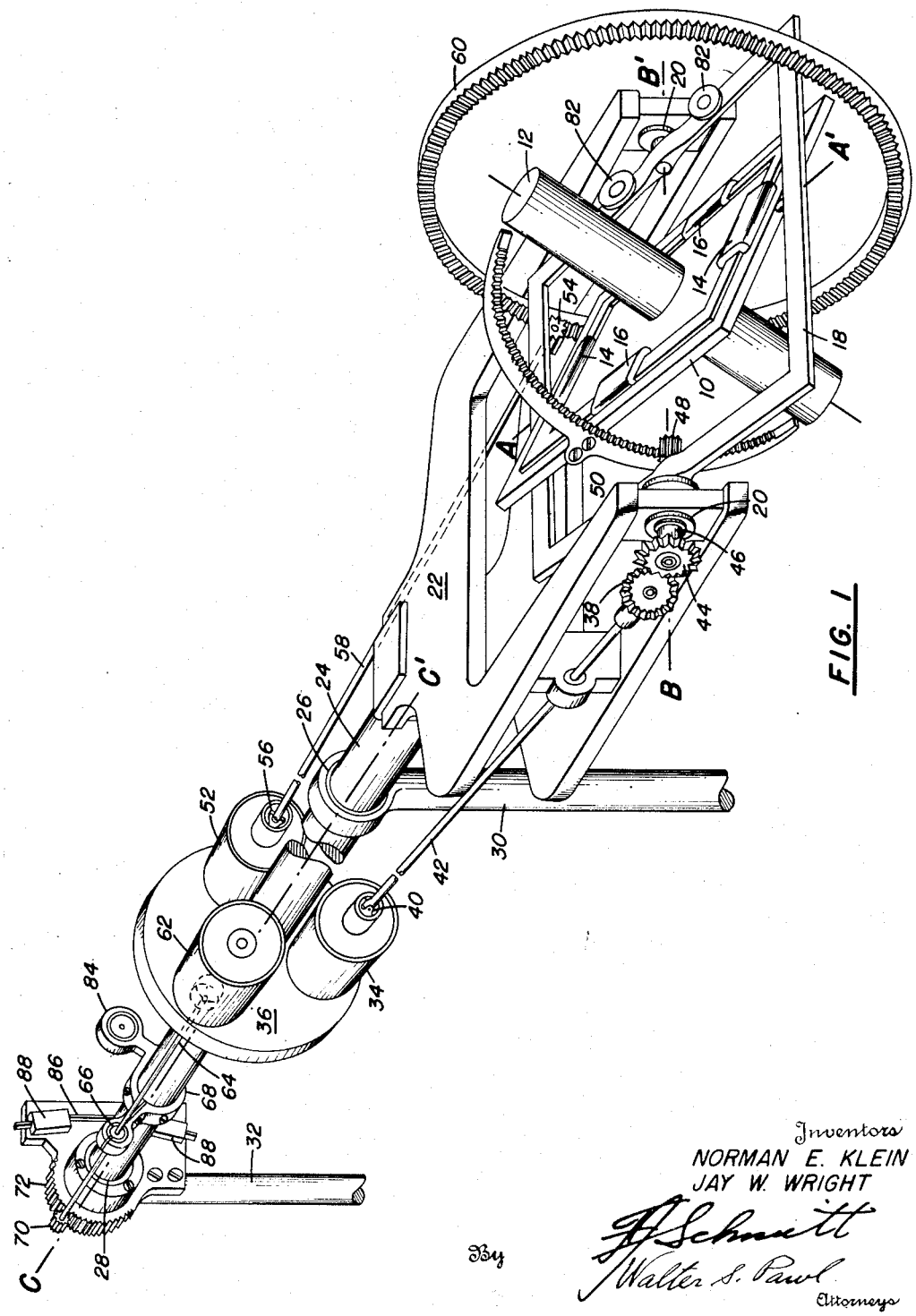
Fig. 1 is a perspective view showing the mechanical arrangements of a device according to the invention.

Conveniently, and as shown in Fig. 1, the detector-magnetometer element is mounted on a supporting plate 10 on which also are mounted the several magnetometer elements comprising a portion of the orientation system, this arrangement preferably being similar to that disclosed in copending application Serial No. 535,158, filed May 11, 1944, Magnetometer Head, Walter H. Brattain, Norman E. Klein and Max S. Richardson, now Patent No. 2,605,344, July 29, 1952. Thus, the detector-magnetometer element is mounted in a tube 12 normal to supporting plate 10 at its approximate center, and paired orientor-magnetometer elements 14 and 16 are mounted in square configuration on the plate centered about the axis of detector-magnetometer element tube 12.

Plate 10 is mounted for rotation about axis A—A' in bearings supported by gimbal ring 18. Gimbal ring 18 is mounted for rotation about axis B—B' in bearings 20, supported by gimbal fork 22. This fork is in turn secured to shaft 24, which is journaled in bearings 26 and 28, mounted respectively on support members 30 and 32, for rotation about axis C—C'.

In the following description, axis A—A' forming the inner axis of a gimbal system will be referred to as the inner axis. Similarly, axis B—B', which forms the outer axis of the gimbal system, will be referred to as the outer axis; and axis C—C', about which the entire gimbal system may be rotated, will be referred to as the third axis.

Due to the fact that several conductors must connect the various magnetometer elements with electronic equipment fixed in the carrier, rotations about each of the inner, outer and third axes are limited by suitable stops not shown in the drawings.

Rotations about each of the three axes above defined may conveniently be effected by means of separate electric motors. In some cases demands upon the rotations about two of the three axes may be such that one motor may be utilized to effect the required rotations about these two axes. In this event, the two axes may conveniently be coupled together mechanically, the specific mechanism used depending upon the type of function relating their rotations.

In the arrangement to be described, separate motors were used to effect each of the three rotations and these were caused appropriately to operate by means of electronic control systems in response to control signals derived from the several orientor magnetometers and additional control signal sources.

Thus, rotations of plate 10 about the inner axis are effected by means of inner axis motor 34, mounted on a supporting member 36 secured to shaft 24. This motor drives bevel gear 38 through universal coupling 40 and shaft 42. Bevel gear 38 engages a similar gear 44, mounted on transfer shaft 46 which is mounted in alignment with the outer axis and journaled for rotation within but independently of the bearing structure supporting gimbal ring 18 for rotation about that axis. The rotation of transfer shaft 46 is transmitted through spur gear 48 to segmental ring gear 50, secured to plate 10. It will be understood that this transmission system is so arranged that rotations of plate 10 about the inner axis will have no effect upon the position of gimbal ring 18 about the outer axis, and that rotations of gimbal 18 about the outer axis will have minimum effect upon the angular position of plate 10 about the inner axis.

Rotations of gimbal ring 18 about the outer axis are effected by means of outer axis motor 52, also mounted on support member 36, which drives spur gear 54 through universal coupling 56 and drive shaft 58. Rotation of shaft 58 is transmitted through spur gear 54 to ring gear 60, mounted on gimbal ring 18 with its axis in alignment with the outer axis of the gimbal system.

Rotation of the entire gimbal assembly about the third axis is effected by means of third axis motor 62, mounted on support member 36. This motor rotates shaft 64 in bearing 66, which is supported by housing 68 secured to shaft 24. Spur gear 70, mounted on shaft 64, engages circular rack 72, secured to support member 32, thereby causing rotations of the entire system about the third axis.

Although gear-drive connections have been described and shown, it will be understood that the rotation of the several parts of the orientation system about the various axes by the drive motors may be effected through any suitable transmission arrangement. Thus, pulleys and belts or friction-drive arrangements may be used if desired.

Rotations of inner and outer axis motors 34 and 52 are controlled by means of paired magnetometer elements 14 and 16, respectively, the output signals from which actuate electronic control equipment preferably of the type disclosed in copending application Serial No. 532,144, filed April 21, 1944. Orientation System, Otto H. Schmitt. The elements of this system are shown in the block diagram of Fig. 2.

Figure 2:
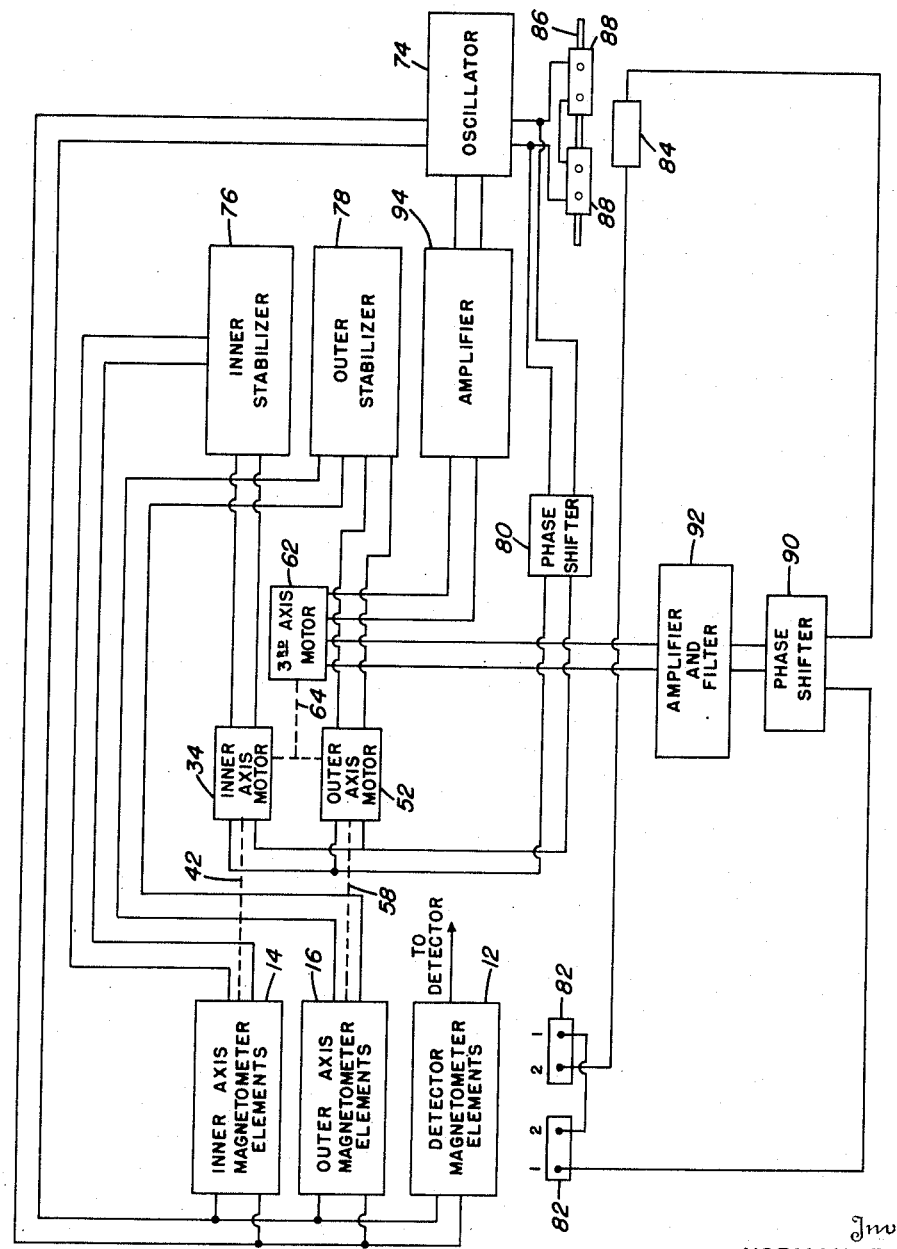
Fig. 2 is a block diagram showing schematically electrical circuits and control means for operating the mechanism shown in Fig. 1, the mechanical connections thereof also being shown schematically.

Thus, and as shown in Fig. 2, the inner and outer axis magnetometer elements 14 and 16 are excited by means of a common oscillator 74, and the output signals from these elements are applied respectively to inner and outer axis stabilizer units 76 and 78. Inner and outer axis motors 34 and 52, respectively, are two-phase motors and excitation is supplied to one winding of each of these motors from oscillator 74, a 90° phase shift being introduced by means of a suitable phase shifter 80. The outputs from the two stabilizer units are applied to the remaining windings of the respective motors, the shafts of which are shown schematically connected to the magnetometer head by means of dashed lines 42 and 58 in Fig. 2. The control system just described is in all respects similar to that disclosed in the copending application last referred to, to which reference is made for a more detailed description.

The third axis motor is arranged for control by means of devices sensitive to rotations of support plate 10 of Fig. 1 about the inner axis. Conveniently, this control is so arranged that rotations produced by third axis motor 62 about the third axis are approximately proportional to rotations of plate 10 about the inner axis. In one form, this control system may comprise means for generating an E. M. F., the amplitude and phase of which depend upon the extent and direction of rotation of plate 10 about the inner axis, means for generating a second E. M. F., the amplitude and phase of which depend upon the extent and direction of rotation of the gimbal unit about the third axis, and means for utilizing the algebraic sum of these E. M. F.'s to control the third axis motor.

Conveniently, the control E. M. F. dependent upon the rotation of plate 10 about the inner axis is generated in a pair of pickup coils 82, mounted on gimbal ring 18, and arranged to measure the magnetic flux from the detector-magnetometer element contained in tube 12. Such detector element may comprise a strip of high-permeability material about which a pair of pickup coils are wound, these coils being arranged also to receive excitation for the magnetometer element from oscillator 74. Conveniently, this excitation is so applied that like magnetic poles are produced at the ends of the detector-magnetometer strip and at the center thereof. Thus, the magnetic flux lines extend between the ends of the detector strip and the center thereof, the flux flowing simultaneously from both ends to the center or vice versa.

Pickup coils 82 are wound about axis normal to the plane of gimbal ring 18 and the turns thereof are thus adapted to be linked by the flux from the detector-magnetometer element. When there is no rotation of plate 10 about the inner axis, that is, when plate 10 and gimbal ring 18 lie in the same plane, the two sets of flux lines between the ends of the detector magnetometer and its center link each of pickup coils 82 in equal amounts and in opposite directions. Consequently, no E. M. F. is generated in these coils.

As soon as plate 10 rotates about the inner axis, the flux linkage through pickup coils 82 becomes unbalanced and an E. M. F. is generated. The generated E. M. F. is either in phase or 180° out of phase with the detector-magnetometer excitation depending upon which end of the detector magnetometer moves toward the pickup coils, while its amplitude depends upon the extent of such motion. Pickup coils 82 are connected in a series-aiding arrangement which serves merely to increase the E. M. F. generated by the flux from the detector magnetometer.

A control E. M. F., proportional to rotation of the gimbal suspension about the third axis, is generated in pickup coil 84, which is arranged to sample the field of an auxiliary magnetic field source mounted on support 32. The auxiliary field source comprises magnetic strip member 86 and two exciting coils 88, which are wound thereon. Excitation is supplied to these coils directly from oscillator 74 and is, therefore, in phase with the excitation supplied to the detector-magnetometer element. The connections to the two exciting coils 88 are so arranged that unlike poles are produced at the ends of magnetic strip member 86. The flux lines therefrom thus extend from one end of the strip member to the other. Pickup coil 84 is mounted on an extension of housing 68 with its axis normal to magnetic strip member 86. Coil 84 is thus arranged to rotate with the gimbal assembly about the third axis in respect to the fixed auxiliary field assembly.

When the gimbal assembly is midway between the limits of its rotation about the third axis, pickup coil 84 is so positioned in respect to magnetic strip member 86 that the flux flowing from one end of strip member 86 to the other is normal to the turns of the coil and a minimum E. M. F. is generated. As the assembly rotates about the third axis, however, the flux lines from strip member 86 link the turns of pickup coil 84 and an appreciable E. M. F. is generated therein. This E. M. F. is either in phase or 180° out of phase with the excitation to strip member 86, depending upon the direction of rotation about the third axis, and has a magnitude dependent upon the extent of such rotation.

As shown in Fig. 2, pickup coil 84 is connected in series with pickup coils 82 and the circuit is so arranged that the E. M. F. generated in the former is in phase opposition with that generated in the latter. The resultant E. M. F. is applied through a 90° phase-shifting network 90 to amplifier and filter circuits indicated at 92. The output of these circuits is applied to one field winding of two-phase third axis motor 62. Excitation for the other field winding of this motor is supplied by oscillator 74, the output of which is amplified in amplifier 94 and applied to the motor, such excitation being in phase with that supplied to the detector-magnetometer element.

In the operation of the third axis control system, let it be assumed that plate 10 is in alignment with gimbal ring 18 and that the entire unit is midway between the limits of its rotation about the third axis. Then, it will be seen that whenever plate 10 departs from this initial position, an E. M. F. is generated in pickup coils 82, and applied through phase shifter 90 and amplifier 92 to the third axis motor. Since there has been no rotation about the third axis, the E. M. F. from pickup coils 82 is unopposed and the entire E. M. F. is applied to phase shifter 90. This E. M. F. is, depending upon the direction of rotation of plate 10, either in phase or 180° out of phase with the detector-magnetometer excitation and with that supplied to the constant field of the third axis motor. Due to the action of phase shifter 90, the excitation applied to the variable field of the third axis motor either leads or lags the constant field excitation by 90° and consequently causes the motor to run. The phase relations between the excitation applied to the two motor fields are such that the motor tends to rotate the gimbal assembly about the third axis in the same sense as the rotation of plate 10 about the inner axis.

As soon as rotation of the gimbal system about the third axis begins, however, an E. M. F. in phase opposition to that generated in pickup coils 82 is generated in pickup coil 84. Thus, depending upon the relative magnitudes of the E. M. F.'s generated in the two sets of pickup coils, the rotation of the gimbal system about the third axis bears a definite relation to the rotation of plate 10 about the inner axis. Furthermore, as soon as rotation of plate 10 about the inner axis stops, the third axis motor is decelerated and stops when the angle through which the gimbal assembly has turned about the third axis bears a chosen relation to the angle of rotation of plate 10 about the inner axis.

Preferably, the control circuits and drive means are so arranged that the angular rotation of the gimbal system about the third axis is approximately equal to the rotation of plate 10 about the inner axis. This condition is met when the proportionality constant relating the two rotations is approximately unity. It will be understood, however, that other proportionality constants of the same order of magnitude may be required, depending upon the relative limits imposed upon the rotations of the various units of the system about the three axes.

Operation of the orientation system above described may be understood by a consideration of the relative angular positions taken by detector plate 10, inner gimbal 18 and gimbal fork 22 as the carrier performs normal maneuvers, and as the magnetic dip angle varies. As indicated above, rotations about the inner and outer gimbal axes to maintain the magnetometer element in alignment with the direction of the uniform magnetic field are effected by means of an orientation system such as, for example, that disclosed in copending application Serial No. 532,144. If the carrier banks and turns or pitches in polar latitudes, alignments may be maintained satisfactorily by rotations only about the inner and outer axes. As the equatorial regions are approached, however, the stops provided to prevent continuous rotation about either the inner or outer axis prevent proper orientation of the detector element. It will be seen, therefore, that the most severe requirements are placed upon the operation of the orientation system at or near the magnetic equator. It is convenient, then, to consider the operation of the third axis control in conjunction with that for the inner and outer axes at the magnetic equator.

In Figs. 3-11, the successive relative positions of the detector plate 10, the gimbal ring 18 and the gimbal fork 22 are shown as the carrier makes a 360° turn to the right at the equator. For ease of illustration, it is assumed in these figures that the proportionality constant relating to rotation of the parts about the inner and third axes is unity. The effect of bank of the carrier is not shown but will be discussed later. The north-seeking end of the detector-magnetometer element is indicated by the arrow head in each figure, and it is assumed that the orientation system is mounted in the carrier in such a manner that the third axis is parallel to the fore-and-aft axis thereof, and that the gimbal fork opening is toward the nose of the carrier.

Figure 3:
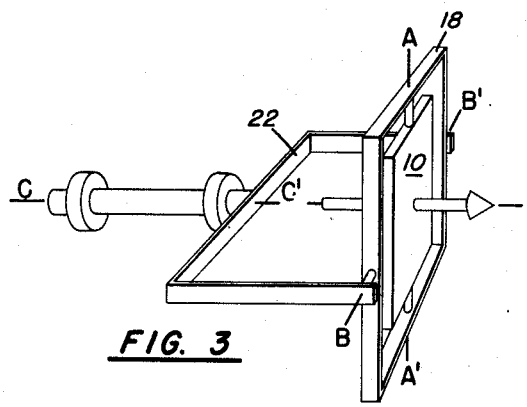
Figs. 3–11 are schematic diagrams showing the relative positions of the supporting means for the magnetometer element for various headings of the carrier at the magnetic equator.

In Fig. 3, the relative positions of the several parts are indicated schematically as the carrier moves on a north heading at the equator. It will appear that, through the operation of the inner and outer axis motors 34 and 52, the detector plate 10 has been oriented in a vertical east-west plane. It will be further noted that, under these conditions, the outer axis is substantially horizontal, that is, the gimbal fork 22 is substantially half way between the limits of its travel if it is assumed that the carrier is on an even keel.

Figure 4:
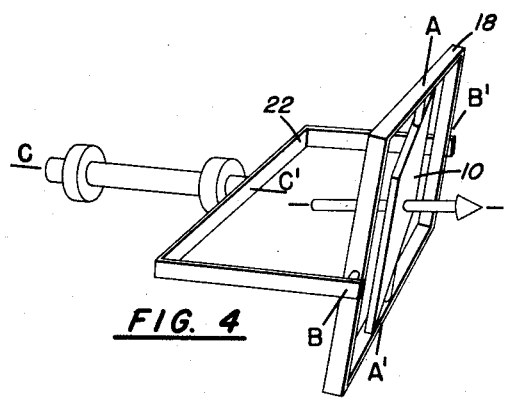

It will be seen that, in order to maintain the desired alignment between the magnetometer element and the magnetic field, the plane of the detector plate 10 must, at all times, lie in the vertical east-west plane irrespective of motion of the carrier. Fig. 4 shows conditions at the beginning of the 360° turn to the right. In this case, therefore, the inner axis orientation system begins to rotate detector plate 10 toward the left about the inner axis.

As soon as detector plate 10 begins to rotate, it will be seen that a control E. M. F. proportional to the rotation of detector plate 10 about the inner axis will be generated in pickup coils 82. This E. M. F. causes rotation of third axis motor 62 in the proper direction to tilt gimbal fork 22 about the third axis, the rotation of the gimbal fork about this axis being equal to that of the detector plate about the inner axis due to the unity proportionality constant assumed above. Thus, the end of the outer axis indicated by B' in that figure begins to rise. This would, if not compensated for, tend to disorient the detector magnetometer. Outer axis motor 52, therefore, begins to tilt gimbal ring 18 about the outer axis to maintain alignment between the detector-magnetometer element and the magnetic field, the effect of this rotation being to maintain gimbal plate 10 in the vertical east-west plane as required.

Figure 5:
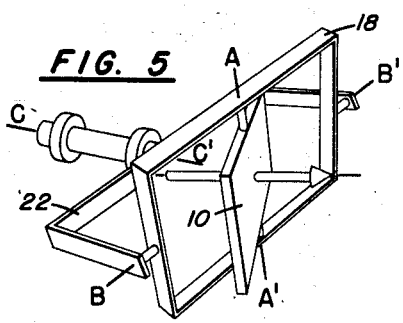

As the turn continues, each of the rotations just described continues, bringing the parts to the relative positions shown in Fig. 5 which represents the conditions existing after the carrier has turned through approximately 45°.

Figure 6:
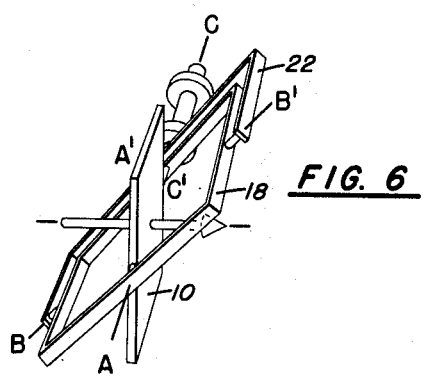
Figure 7:
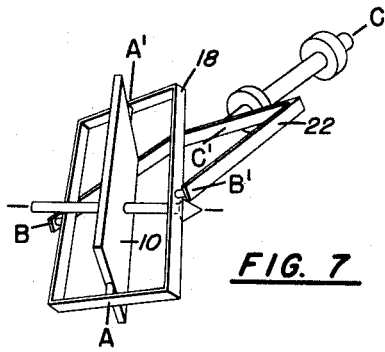

In Fig. 6, the relative positions of the parts are shown after the carrier has completed a 90° turn. It will be noted that rotation of gimbal fork 22, about the third axis, has continued until the end of the outer axis indicatted by B' has been lifted sufficiently to allow passage of the detector-magnetometer element beneath that end of the gimbal fork. Compensating rotations about the outer axis have continued until gimbal ring 18 occupies the position shown in this figure. Thus it will be seen that detector plate 10 has rotated through an angle of approximately 45° about the inner axis, gimbal ring 18 has rotated through an angle of approximately 90° about the outer axis, and gimbal fork 22 has, due to the choice of unity proportionality constant, rotated through an equal angle of approximately 45° about the third axis. The plane of detector plate 10 still lies in the vertical east-west plane although the plate itself has been rotated about the longitudinal axis of the detector-magnetometer element to the position shown in Fig. 6.

When the various parts have reached the position shown in Fig. 6, the counter E. M. F. generated in pickup coil 84 has become great enough to stop rotation about the third axis of gimbal fork 22. As the turn continues, the parts approach the relative positions shown in Fig. 7. It will be noted that, due to the tilted position of gimbal fork 22, rotation about the outer axis of gimbal ring 18 continues in order to maintain the required alignment. This causes reversal in the rotation of plate 10 about the inner axis and consequent reversal in phase of the E. M. F. generated in pickup coils 82. Gimbal fork 22, therefore, reverses its rotation about the third axis and begins to return to its initial position.

Figure 8:
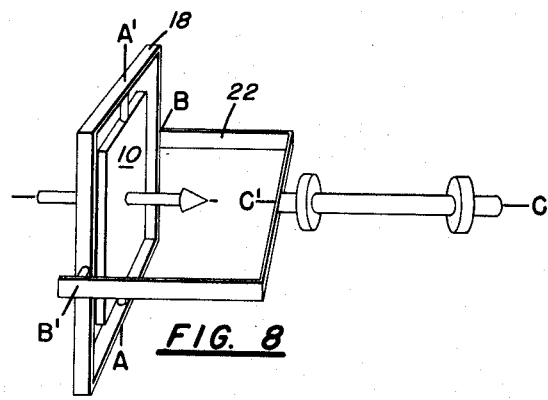

As the turn continues, the parts reach the positions shown in Fig. 8, which represents the conditions existing after a 180° turn. It will be seen from this figure that gimbal fork 22 has returned to its initial angular position about the third axis, while gimbal ring 18 has turned through 180° about the outer axis. Due to the reversal in the direction of detector plate 10, however, this plate has returned to its initial position in respect to gimbal ring 18. Since both plate 10 and gimbal fork 22 occupy their original positions, no control E. M. F. is applied to third axis motor 62 and the motor stops.

Figure 9:
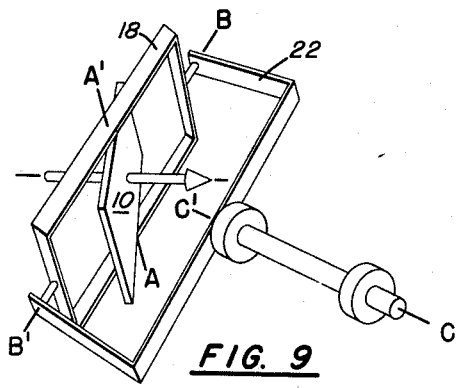

As the carrier continues to turn, the inner axis motor again rotates detector plate 10 about the inner axis. This time, however, due to the 180° rotation of gimbal ring 18 about the outer axis, the rotation is in the opposite sense to that caused by the inner axis motor at the initiation of the turn. The E. M. F. generated in pickup coils 82, therefore, tends to cause rotation of gimbal fork 22 in a direction opposite to that of its initial rotation, causing the end of the outer axis indicated at B to rise. Such rotation about the third axis, however, again necessitates rotation of gimbal fork 18 about the outer axis to maintain the desired alignment of the detector-magnetometer element. In this case, rotation about the outer axis is also in the opposite sense to that noted during the first portion of the turn. The relative positions of the parts under these conditions are shown in Fig. 9.

Figure 10:
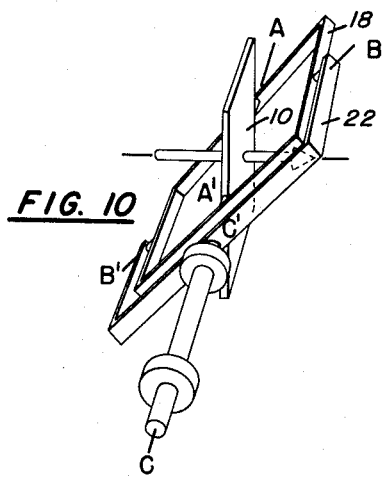

As the turn continues, the parts reach the positions shown in Fig. 10, which represents the conditions existing after a 270° turn. Rotation about the inner axis has continued until detector plate 10 has again turned through an angle of approximately 45°. Gimbal ring 18 has turned through 90°, while gimbal fork 22 has rotated through approximately 45°, its angular movement being equal to that of detector plate 10 about the inner axis. At this position also, the plane of detector plate 10 continues to lie in the east-west vertical plane.

Figure 11:
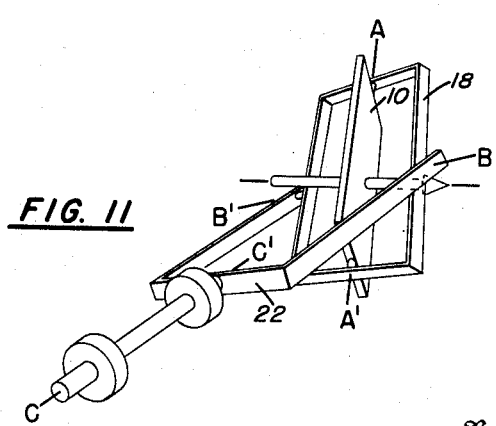

The relative positions of the various parts, as the turn continues, are shown in Fig. 11. Rotation about the outer axis has continued, necessitating reversal of the rotation of detector plate 10 about the inner axis. Such reversal of rotation of the detector plate causes reversal of the rotation of gimbal fork 22 about the third axis, thus tending to return the gimbal fork to its initial horizontal position.

From the above, it will be seen that detector plate 10 has been rotated through 360° in respect to the carrier and that this has been accomplished without necessitating continuous 360° rotation about any of the three supporting axes. If operation takes place in latitudes such that the magnetic dip angle is appreciably greater than 0°, the demands upon the orientation system are somewhat reduced. Under such conditions, rotations about the three axes are through smaller angles and no difficulty is experienced in maintaining alignment of the detector-magnetometer element with the magnetic field.

In the foregoing, it has been assumed that the carrier did not bank as it turned. Consideration of Figs. 3–11 of the drawings will show that if the carrier banks, rotations about the third axis must be made accordingly to compensate for the misalignment between the detector-magnetometer element and the magnetic field which would otherwise be created. In addition, it will be seen that, if operation is continued in regions south of the magnetic equator when the orientation systems and detector magnetometer are arranged for operation in the northern hemisphere (as shown in Figs. 3–11), rotations about the inner and outer gimbal axes must be increased accordingly. For these reasons, the orientation system when so arranged will operate for only a relatively short distance beyond the magnetc equator, the exact distance being dependent upon the degree of bank of the carrier as it turns. Operation in the southern hemisphere and for short distances north of the equator may be had, as pointed out above, by effectively "turning over" the detector-magnetometer element.

In one successful orientation system according to the invention, mechanical construction imposed the following limits upon the rotations about the three supporting axes: Detector plate 10 was arranged to rotate through angles of ±72.5°, measured from the plane of gimbal ring 18; gimbal ring 18 was arranged to rotate about the outer axis through an angle of ±131°, measured from the plane of gimbal fork 22; and gimbal fork 22 was arranged to rotate about the third axis through an angle of ±63°, measured from the horizontal plane. With these limitations, alignment could be maintained, with the system arranged for northern hemisphere operation, in all regions in the northern hemisphere and beyond the equator to locations at which the dip angle approached −10°, so long as the bank of the aircraft while turning did not exceed 47.5° and so long as the aircraft did not pitch during turns. For turns requiring smaller bank angles, operation could be extended further to the south.

A multi-contact switch is incorporated for the purpose of "turning over" the detector electrically, thereby to adapt the orientation system as arranged for operation in the northern hemisphere for use in the southern hemisphere and at latitudes north of the equator such that the dip angle does not exceed −10°. This switch includes contacts in a circuit (not shown) to reverse the polarity of the bias current supplied to the detector-magnetomotor element and contacts 93 to reverse the phase of the excitation supplied to the orientor-magnetometer elements.

Having thus described our invention, we claim:

In an orientation system for maintaining a plane substantially normal to a relatively uniform magnetic field: a gimbal suspension supporting said plane for rotation about inner and outer gimbal axes; means supporting said gimbal suspension for rotation about a third axis substantially perpendicular to said outer gimbal axis; drive means for rotating said plane about said inner and outer axis; means sensitive to changes in the direction of said magnetic field in respect to said plane for controlling said drive means; drive means for rotating said gimbal suspension about said third axis; and control means for said last-mentioned drive means comprising means mounted on said plane for producing a first local magnetic field, means fixed in respect to said inner gimbal axis for sampling said first local magnetic field, means fixed in respect to said third axis for producing a second local magnetic field, means rotatable with said third axis for sampling said second local magnetic field, and means utilizing the algebraic sum of the outputs of said sampling means for controlling said last-mentioned drive means.

NORMAN E. KLEIN.
JAY W. WRIGHT.

References Cited in the file of this patent

UNITED STATES PATENTS

| Number | Name | Date |
|---|---|---|
| 2,468,554 | Hull | Apr. 26, 1949 |